United States Patent [19]

Ohashi et al.

[11] Patent Number: 4,914,532
[45] Date of Patent: Apr. 3, 1990

[54] METHOD OF EFFICIENTLY ERASING DATA IN ACCORDANCE WITH TYPE OF MAGNETIC RECORDING MEDIUM AND APPARATUS FOR REALIZING THE SAME

[75] Inventors: Hiroshi Ohashi; Yoshiaki Uchida; Masahiro Kusunoki, all of Tokyo, Japan

[73] Assignee: Kabushiki Kaisha Toshiba, Kawasaki, Japan

[21] Appl. No.: 213,808

[22] Filed: Jun. 30, 1988

[30] Foreign Application Priority Data

Jun. 30, 1987 [JP] Japan .................. 62-162886

[51] Int. Cl.$^4$ .................. G11B 5/024; G11B 27/36
[52] U.S. Cl. .................. 360/66; 360/31; 360/67
[58] Field of Search .................. 360/46, 61, 66, 67, 360/31

[56] References Cited

U.S. PATENT DOCUMENTS

| | | | |
|---|---|---|---|
| 4,164,781 | 8/1979 | Brown | 360/66 |
| 4,300,174 | 11/1981 | Harman et al. | 360/66 |
| 4,466,025 | 8/1984 | Soejima | 360/61 |
| 4,638,472 | 1/1987 | Ogata et al. | 360/31 |
| 4,644,419 | 2/1987 | Iinuma et al. | 360/46 |
| 4,656,533 | 4/1987 | Sakai et al. | 360/46 |
| 4,799,115 | 1/1989 | Rogers et al. | 360/66 |
| 4,813,011 | 3/1989 | Kulakowski et al. | 369/44 |

FOREIGN PATENT DOCUMENTS 61-39910 2/1986 Japan .
61-39911 2/1986 Japan .

OTHER PUBLICATIONS

Toshiba Review No. 154 Winter 1985, Barium Ferrite Perpendicular Recording Floppy Disk.
IEEE Transactions on Magnetics, vol. Mag-22, No. 5, Sep. 1986, High Density Recording Characteristics for Ba-Ferrite Flexible Disks.

Primary Examiner—Vincent P. Canney
Assistant Examiner—Surinder Sachar
Attorney, Agent, or Firm—Cushman, Darby & Cushman

[57] ABSTRACT

A magnetic recording apparatus capable of efficiently erasing data in accordance with a type of magnetic recording medium, comprises a current source, an erase head for erasing data recorded on a recording medium using a supplied erase current, and a current supplying section for supplying an erase current from the current source to the erase head in accordance with input erase current control data. The current supplying section comprises a selecting section for selecting a combination of a plurality of control elements in accordance with the input erase current control data, and a supplying section for supplying an erase current determined in accordance with the selected combination from the current source to the erase head.

8 Claims, 4 Drawing Sheets

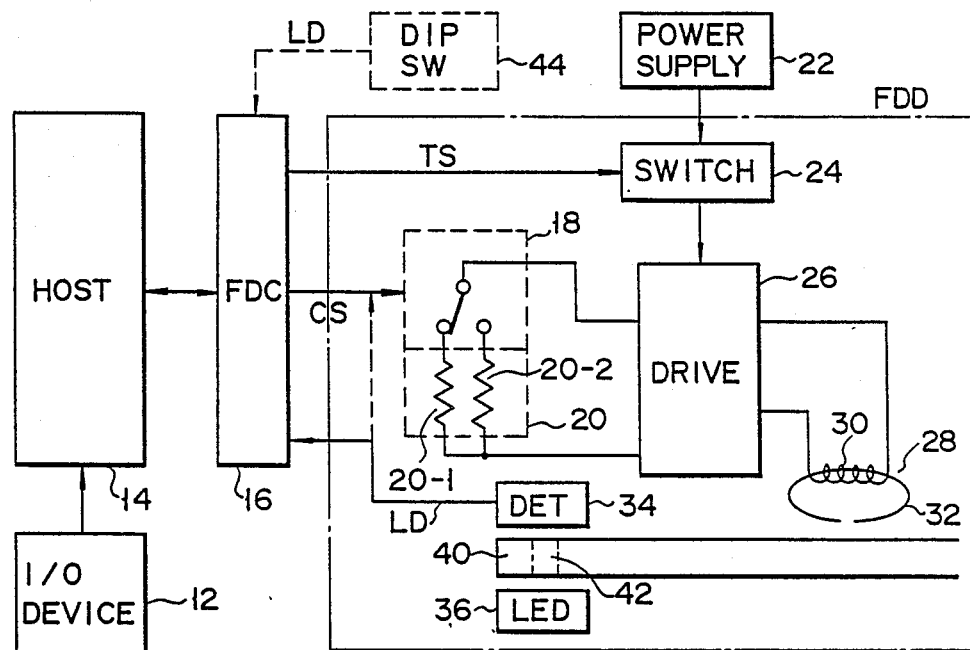
F I G. 2

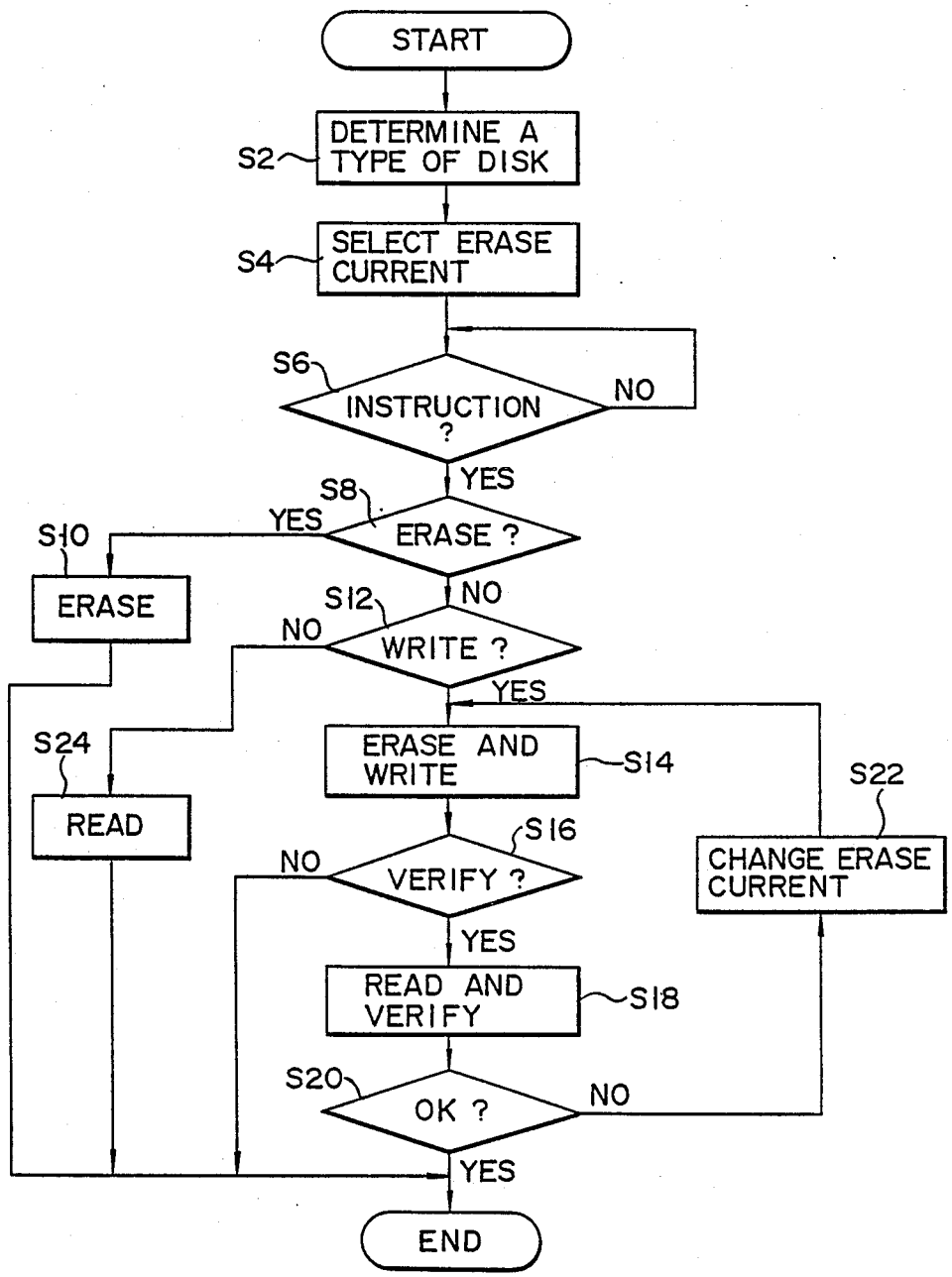
F I G. 3

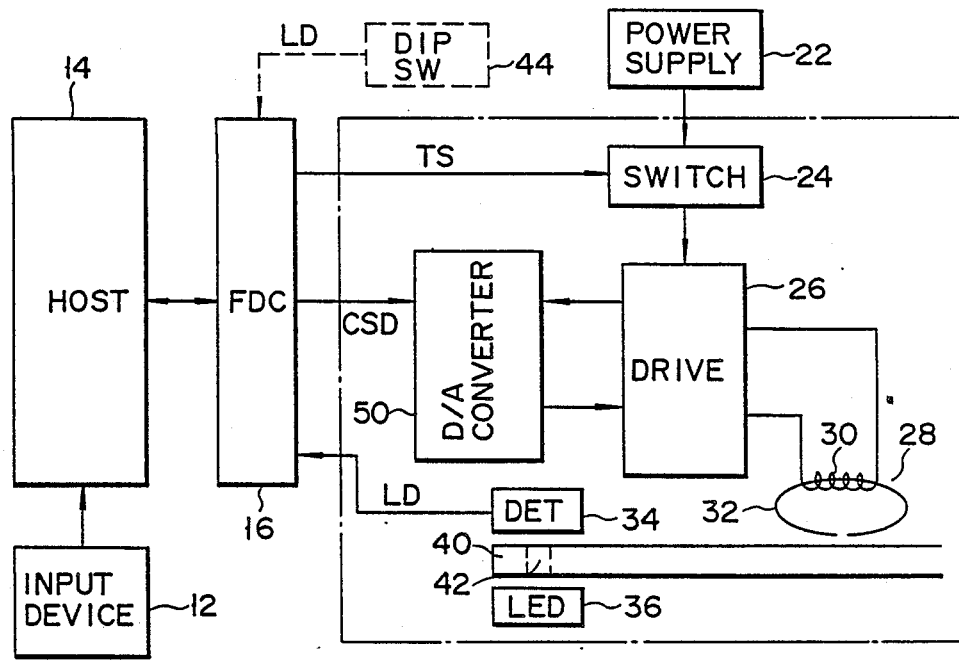
F I G. 6

METHOD OF EFFICIENTLY ERASING DATA IN ACCORDANCE WITH TYPE OF MAGNETIC RECORDING MEDIUM AND APPARATUS FOR REALIZING THE SAME

BACKGROUND OF THE INVENTION

1. Field of the Invention

The present invention relates to a magnetic recording apparatus such as a floppy disk unit.

2. Description of the Related Art

Due to a demand for high-density recording, a magnetic head of an preerase system is proposed in a magnetic recording apparatus such as a floppy disk unit. In the magnetic head of this system, an erase head having a large gap length is located at a position preceding a read/write head in a running direction of a disk serving as a magnetic recording medium. As a result, data is erased by the erase head before data is recorded by the read/write head, thereby ensuring compatibility of read/write operation for the disk. In conventional magnetic recording apparatuses using the above-described pre-erase system or the tunnel erase system, a constant erase current is supplied to an erase head to erase data written on a disk.

Magnetic recording media used in a magnetic recording apparatus vary in type depending on differences in recording density and the like. For example, $\gamma$-$Fe_2O_3$ coating type, Co-$\gamma$-$Fe_2O_3$ coating type, Ba-ferrite coating type, metal powder coating type, and Co-Cr sputtering type media are used. They are magnetic materials having different coercive forces, and have been developed to increase a recording density or are under development. If coercive forces differ, optimal erase currents also differ.

In order to erase data written on a disk using a magnetic material with a large coercive force, a large erase current may be allowed to flow. However, if a large current value is applied to a disk using a magnetic material having a small coercive force, a problem as shown in FIG. 1 is posed. More specifically, a leaking magnetic flux from an erase gap of an erase head detours to a read/write (R/W) head, and hence a recording waveform tends to be distorted. As recording density is increased, which is a recent trend, distance L between the gaps is decreased. Therefore, if an erase current is set in accordance with a disk having a high recording density, a leaking magnetic flux tends to detour to the read/write (R/W) head when a disk having a low recording density is used. Distortion of a recording waveform is noticeable particularly in a disk having a small coercive force. If the value of an erase current is decreased in order to prevent this problem, data written on a disk having a high recording density cannot be satisfactorily erased.

As described above, in the conventional magnetic recording apparatus with a constant erase current, perfect erasure cannot be expected. In order to perform perfect erasure, an erase current to be supplied to an erase head must be changed in accordance with a type of magnetic recording medium.

SUMMARY OF THE INVENTION

The present invention has been made in consideration of the above-described situation, and has as its object to provide a method in which even when a plurality of magnetic recording media consisting of different types of magnetic materials are used, data can be efficiently erased in accordance with the types, and a magnetic recording apparatus for realizing the method.

A magnetic recording apparatus capable of efficiently erasing data in accordance with a type of magnetic recording medium, comprises: a current source, an erase head for erasing data recorded on a recording medium using a supplied erase current, and a current supply section for supplying an erase current from the power supply to the erase head in accordance with input erase current control data.

A method of efficiently erasing data in accordance with a type of magnetic recording medium, comprises: determining a type of recording medium, selecting an erase current in accordance with the determined type of recording medium, and erasing data on the recording medium using the selected erase current.

As described above, according to the present invention, since an erase current to be supplied to an erase head can be switched in accordance with the type of magnetic recording medium, even when a plurality of magnetic recording media consisting of different types of magnetic materials are used, substantially perfect erasure can be performed in accordance with the types.

BRIEF DESCRIPTION OF THE DRAWINGS

FIG. 2 is a block diagram showing an arrangement of a magnetic recording apparatus according to a first embodiment of the present invention;

FIG. 3 is a flow chart for explaining the operation of the first embodiment;

FIG. 6 is a block diagram showing an arrangement of a magnetic recording apparatus according to a second embodiment of the present invention.

DETAILED DESCRIPTION OF THE PREFERRED EMBODIMENTS

Figure 1:
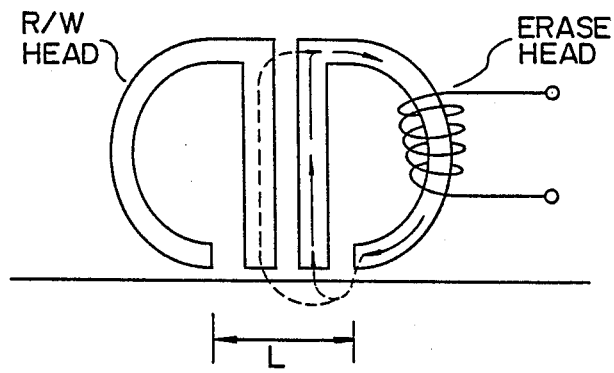
FIG. 1 is a view showing a structure of conventional read/write and erase heads.

A magnetic recording apparatus according to the present invention will be described in detail below with reference to the accompanying drawings.

A first embodiment will now be described with reference to FIG. 2.

Floppy disk controller (FDC) 16 is connected to host 14 which is, in turn, connected to I/O device 12. Upon reception of a command, e.g., a format or write/verify command from device 12, host 14 outputs an instruction to FDC 16 in accordance with the command.

Power supply 22 supplies a DC current to switch 24. Switch 24 supplies the current from power supply 22 to drive 26 in accordance with control signal TS from FDC 16. Switch 18 and erase current selecting elements, i.e., resistors 20-1 and 20-2, are connected to drive 26. Erase head 28 is connected to drive 26. Head 28 comprises erase coil 30 and core 32. Switch 18 selects one of resistors 20-1 and 20-2 in accordance with control signal CS from FDC 16. Drive 26 supplies an erase current, which is determined by the selected resistor, from power supply 22 to erase head 28 through switch 24. With this operation, data recorded on disk 40 is erased.

When disk 40 is inserted, detector 34 receives light from LED 36 via through hole 42 formed in disk 40, and detects whether disk 40 has a high recording density. Since the recording density of a disk is associated with the magnetic material used for the disk, the erase current of the disk can be indirectly determined. Detector 34 outputs a detection result to FDC 16 as signal LD. In response to signal LD, FDC 16 outputs signal CS to switch 18. In this case, signal LD can be directly supplied to switch 18 as signal CS without going through FDC 16. With this arrangement, control for generating signal CS from signal LD in FDC 16 becomes unnecessary.

In addition, instead of determining whether disk 40 has a high recording density or not using detector 34, a type of disk can be designated using dip switch 44. In this case, signal LD is output from dip switch 44 to FDC 16. A type of disk may be input from device 12.

The operation of the magnetic recording apparatus according to the first embodiment will be described below with reference to FIG. 3.

Magnetic recording media (floppy disks) used in the magnetic recording apparatus vary in type depending on differences in recording density and the like. For example, $\gamma$-$Fe_2O_3$ coating type, Co-$\gamma$-$Fe_2O_3$ coating type, Ba-ferrite coating type, metal powder coating type, and Co-Cr sputtering type media are used. These recording media include different magnetic materials, and hence have different optimal erase currents.

Figure 5A:
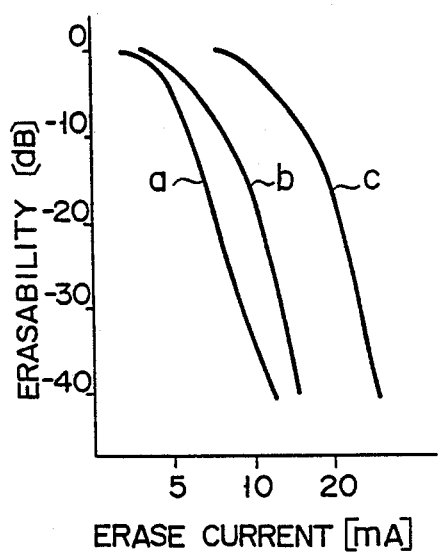
FIG. 5A is a graph showing a relationship between erase currents and erasability in different magnetic recording media.
Figure 5B:
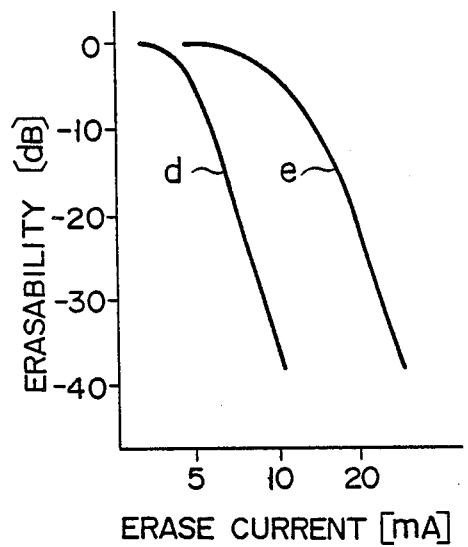
FIG. 5B is a graph showing a relationship between erase currents and erasability in different magnetic heads.

For example, when erasure is performed with respect to three types of magnetic recording media including different magnetic materials, the relationships between erase currents and erasability of the three types of magnetic recording media are represented by curves a, b and c, as shown in FIG. 5A. It is apparent from these curves that the respective optimal erase currents differ from each other. When erasure is performed with respect to a single magnetic recording medium using two types of magnetic heads, the relationships between erase currents and erasability of the two types of magnetic heads are represented by curves d and e, as shown in FIG. 5B. Accordingly, even when erasure is performed with respect to a single magnetic recording medium, if different magnetic heads are used, optimal erase currents for erasing data may differ.

Generally, an erasure characteristic is improved with an increase in erase current. On the other hand, an excessive increase in erase current is not preferable because it leads to an increase in power consumption, detouring of an erase magnetic flux to the read/write head, and oversaturation of the magnetic head. Thus, an optimal erase current may be considered as a value which falls within the range for satisfying a required erasure ratio and is not excessively large.

Assume that a mark or a characteristic in appearance for indicating a magnetic material used for such a magnetic recording medium (floppy disk) as described above or for a case for enclosing it is provided. In this embodiment, through hole 42 is formed in disk 40. Assume that such a disk 40 is inserted into the magnetic recording apparatus.

In step S2, the type of a disk is detected by LED 36 and detector 34, and then signal LD is output to FDC 16. FDC 16 outputs signal CS to switch 18 in accordance with signal LD. As a result, one of resistors 20-1 and 20-2 is selected. An erase current to be flowed is selected in this manner in step S4.

In step S6, input of a command is waited for. The command is input by an operator through I/O device 12. A format command, a copy command, or the like is supplied as the command. A verify command can be optionally added to a command requiring a write access, e.g., the copy command. Upon reception of a command, host 14 outputs a corresponding instruction to FDC 16. In response to the input instruction, FDC 16 executes processing following step S8.

In step S8, it is checked whether the instruction is an erase instruction or not. If YES (Y) in step S8, step S10 is executed, thereby performing erase processing of disk 40 using the erase current selected in step S4. If NO (N) in step S8, step S12 is executed, so that data recorded by a read/write head (not shown) is read out. If Y in step S12, step S14 is executed.

In step S14, normal write processing is executed. In this embodiment, since the magnetic recording apparatus employs the pre-erase system, data which has been recorded is erased by a selected erase current to be flowed through erase head 28 prior to write processing of data. New data is written by the read/write head immediately after the above processing. In step S16, a verify command is supplied from device 12, and it is checked whether a corresponding instruction is supplied or not. If N in step S16, the processing is finished. If Y in step S16, newly written data is read out, and is verified by host 14 in step S18. If the result is YES in step S20, the processing is ended. If N in step S20, step S22 is executed, and the value of an erase current is changed. That is, if resistor 20-1 is currently selected, signal CS is output from FDC 16, and contact of switch 18 is switched from resistor 20-1 to resistor 20-2. After this, step S14 is executed again.

Although the erase current selecting element is constituted by two resistors in this embodiment, a larger number of selecting elements may be prepared.

Figure 4:
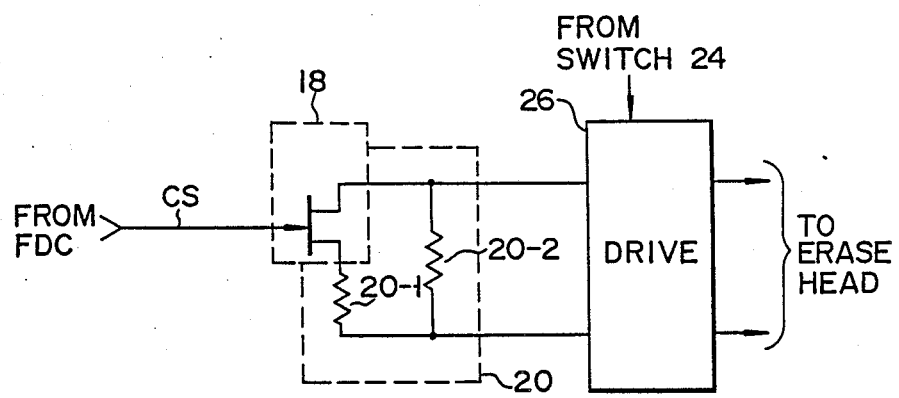
FIG. 4 is a block diagram of a switch and an erase current selecting element according to another embodiment.

FIG. 4 shows switch 18 and selecting element 20 according to another embodiment. In this embodiment, switch 18 is connected to only resistor 20-1. Resistor 20-2 is not connected to the switch. Initially, only resistor 20-2 is selected, and the value of an erase current is determined by resistor 20-2. When signal CS is supplied, switch 18 is turned on, and resistors 20-1 and 20-2 are connected in parallel. An erase current determined by the two resistors is supplied to erase head 28 through drive 26. In this case, the operation is the same as that in the first embodiment.

A second embodiment will be described with reference to FIG. 6. Since most parts of the arrangements are the same as those in the first embodiment, only a different point will be described.

When FDC 16 receives signal LD from detector 34, FDC 16 outputs data CSD, in place of signal CS, to D/A converter 50. D/A converter 50 converts data CSD into an analog signal. The value of an erase current is determined by the analog signal. The operation of this embodiment is the same as that in FIG. 3.

What is claimed is:

1. A magnetic recording apparatus for writing on a recording medium, said recording apparatus comprising:

instruction determining means for determining if an input instruction is a write instruction with or without a verify instruction;

erasing means, having an erase head, for erasing data recorded on a data area of said recording medium utilizing said erase head with a supplied erase current when it is determined by said instruction determining means that said instruction is said write instruction;

writing means for writing new data on said data area of said recording medium when it is determined by said instruction determining means that said instruction is said write instruction;

verifying means for reading said new data from said recording medium when it is determined by said instruction determining means that said write instruction is accompanied by said verify instruction, and determining if said new data is correctly written;

current supply means for supplying said erase current to said erasing means; and control means for generating a change command when said verifying means determine that said new data is incorrectly written and changing a value of said erase current supplied by said current supply means to a new value in response to said change command.

2. Apparatus according to claim 1, wherein said control means includes:

a plurality of resistive elements; and selection means for selecting at least one of said plurality of resistive elements in response to said change command to determine said new value of said erase current in accordance with a value of current flowing through said at least one selected resistive element.

3. Apparatus according to claim 1, wherein said control means includes:

first and second resistive elements; and selection means for selectively connecting said second resistive element to said first resistive element in accordance with said change command such that said first and second resistive elements are connected in parallel, to determine said new value of said erase current in accordance with a value of current flowing through one of said first resistive element and said first and second resistive elements.

4. Apparatus according to claim 1, further comprising means for generating and outputting said write instruction with said verify instruction to said instruction determining means when said verifying means determines that said new data is incorrectly written.

5. A method of writing on a recording medium, comprising the steps of:

determining if an instruction is a write instruction with or without a verify instruction;

erasing data recorded on a data area of said recording medium utilizing an erase head when it is determined that said instruction is said write instruction;

writing new data on the data area of said recording medium when it is determined that said instruction is said write instruction;

reading the new data from said recording medium to determine if said new data is correctly written when it is determined that said write instruction is accompanied by said verify instruction; and supplying to said erase head an erase current, a value of said erase current being changed when it is determined that said new data is not correctly written, wherein said supplying step includes the steps of generating a change command when it is determined that said new data is not correctly written, changing a value of said erase current to a new value in response to said change command and supplying to said erase head said erase current determined in accordance with said changed value.

6. A method according to claim 5, wherein said changing step of said supplying step includes:

selecting at least one of a plurality of resistive elements in response to said change command; and determining said new value of said erase current in accordance with a value of current flowing through said at least one selected resistive element.

7. A method according to claim 5, wherein said changing step of said supplying step includes:

selectively connecting in parallel a first resistive element and a second resistive element in accordance with said change command; and determining said new value of said erase current in accordance with a value of current flowing through one of said first resistive element and said first and second resistive elements.

8. A method according to claim 5, further comprising the step of generating said write instruction with said verify instruction when it is determined that said new data is incorrectly written.

* * * * *